(12) United States Patent
Krishnamurthi

(10) Patent No.: US 9,892,245 B2
(45) Date of Patent: Feb. 13, 2018

(54) METHOD AND APPARATUS FOR USING A MULTI-FACTOR PASSWORD OR A DYNAMIC PASSWORD FOR ENHANCED SECURITY ON A DEVICE

(71) Applicant: QUALCOMM Incorporated, San Diego, CA (US)

(72) Inventor: Govindarajan Krishnamurthi, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/487,093

(22) Filed: Apr. 13, 2017

(65) Prior Publication Data

US 2017/0220785 A1    Aug. 3, 2017

Related U.S. Application Data

(63) Continuation of application No. 13/196,864, filed on Aug. 2, 2011, now Pat. No. 9,659,164.

(51) Int. Cl.
*G06F 21/31* (2013.01)
*G06F 21/40* (2013.01)

(52) U.S. Cl.
CPC ........... *G06F 21/31* (2013.01); *G06F 21/40* (2013.01); *G06F 2221/2111* (2013.01); *H04L 2463/082* (2013.01)

(58) Field of Classification Search
CPC ................................. G06F 21/31; G06F 21/40
See application file for complete search history.

(56) References Cited

U.S. PATENT DOCUMENTS 6,845,453 B2 * 1/2005 Scheidt ............... G06F 21/31
                                                        705/50
6,904,526 B1 * 6/2005 Hongwei ............ G06F 21/31
                                                       713/172

(Continued)

FOREIGN PATENT DOCUMENTS

CN       101154252 A      4/2008
JP       2000076450 A     3/2000

(Continued)

OTHER PUBLICATIONS

Berbecaru Diana, "LRAP: A Location-Based Remote Client Authentication Protocol for Mobile Environments," 2011 19th International Euromicro Conference of Parallel, Distributed and Network-Based Processing, IEEE Computer Society, pp. 141-145.

(Continued)

*Primary Examiner* — Kambiz Zand
*Assistant Examiner* — Tongoc Tran
(74) *Attorney, Agent, or Firm* — Kilpatrick Townsend & Stockton

(57) ABSTRACT

A method and apparatus for performing authentication may comprise: determining a first value of a dynamic password applicable for a first scenario, the dynamic password having a plurality of values for a plurality of scenarios defined by at least one parameter; authenticating a user in the first scenario by a device based on the first value of the dynamic password; determining a second value of the dynamic password applicable for a second scenario; and authenticating the user in the second scenario by the device based on the second value of the dynamic password.

19 Claims, 4 Drawing Sheets

(56) References Cited

U.S. PATENT DOCUMENTS

| | | | |
|---|---|---|---|
| 7,178,025 B2* | 2/2007 | Scheidt | G06F 21/31 705/67 |
| 7,373,515 B2* | 5/2008 | Owen | G06F 21/31 713/182 |
| 7,849,501 B2* | 12/2010 | Vishik | G06Q 20/0855 705/50 |
| 8,006,291 B2* | 8/2011 | Headley | H04L 9/3271 713/186 |
| 8,234,220 B2* | 7/2012 | Weiss | G06F 21/32 705/64 |
| 8,245,292 B2* | 8/2012 | Buer | G06F 21/34 713/172 |
| 8,332,647 B2* | 12/2012 | Bradley, II | H04L 63/0823 713/176 |
| 8,365,258 B2* | 1/2013 | Dispensa | H04L 63/0869 705/64 |
| 8,656,472 B2* | 2/2014 | McMurtry | G06F 21/335 713/185 |
| 8,683,582 B2 | 3/2014 | Rogers | |
| 8,875,264 B2* | 10/2014 | Tamai | G06F 21/36 713/168 |
| 9,659,164 B2 | 5/2017 | Krishnamurthi et al. | |
| 2002/0184538 A1* | 12/2002 | Sugimura | G06F 21/32 726/5 |
| 2007/0037552 A1* | 2/2007 | Lee | G06Q 20/04 455/410 |
| 2007/0050840 A1* | 3/2007 | Grandcolas | G06F 21/42 726/5 |
| 2007/0125838 A1* | 6/2007 | Law | G06Q 20/04 235/379 |
| 2007/0130472 A1* | 6/2007 | Buer | H04L 63/0428 713/182 |
| 2007/0150747 A1* | 6/2007 | Mani | G06F 21/316 713/186 |
| 2007/0220253 A1* | 9/2007 | Law | H04L 63/0838 713/168 |
| 2007/0234063 A1* | 10/2007 | Ueda | G06F 21/31 713/183 |
| 2007/0255953 A1* | 11/2007 | Peyret | H04L 9/32 713/168 |
| 2008/0086759 A1* | 4/2008 | Colson | G06F 21/34 726/2 |
| 2008/0307515 A1* | 12/2008 | Drokov | G06Q 20/32 726/7 |
| 2009/0037988 A1* | 2/2009 | Yang | H04L 9/3273 726/6 |
| 2009/0138953 A1* | 5/2009 | Lyon | G06Q 20/04 726/9 |
| 2009/0185687 A1* | 7/2009 | Wankmueller | H04L 9/3273 380/277 |
| 2009/0235346 A1* | 9/2009 | Steinberg | G06F 21/445 726/8 |
| 2009/0254975 A1* | 10/2009 | Turnbull | H04L 63/0492 726/3 |
| 2010/0186074 A1* | 7/2010 | Stavrou | G06F 21/36 726/7 |
| 2010/0253471 A1* | 10/2010 | Abe | G06F 21/32 340/5.83 |
| 2010/0319057 A1* | 12/2010 | Murai | G06F 21/305 726/5 |
| 2010/0325721 A1* | 12/2010 | Bandyopadhyay | G06F 21/316 726/19 |
| 2011/0004921 A1* | 1/2011 | Homer | G06F 21/31 726/3 |
| 2011/0083016 A1* | 4/2011 | Kesanupalli | G06Q 20/10 713/180 |
| 2011/0162051 A1* | 6/2011 | Li | G06F 21/31 726/5 |
| 2012/0131650 A1* | 5/2012 | Gutt | H04B 7/18593 726/5 |
| 2012/0144468 A1* | 6/2012 | Pratt | G06F 21/40 726/7 |

FOREIGN PATENT DOCUMENTS

| | | |
|---|---|---|
| JP | 2003050783 A | 2/2003 |
| JP | 2003196238 A | 7/2003 |
| JP | 2004118456 A | 4/2004 |
| JP | 2004240645 A | 8/2004 |
| JP | 2004334788 A | 11/2004 |
| JP | 2006505021 A | 2/2006 |
| JP | 2006070920 A | 3/2006 |
| JP | 2007124470 A | 5/2007 |
| JP | 2007173951 A | 7/2007 |
| JP | 2007310661 A | 11/2007 |
| JP | 2007334707 A | 12/2007 |
| JP | 2008070920 A | 3/2008 |
| JP | 2008299589 A | 12/2008 |
| JP | 2009071430 A | 4/2009 |
| JP | 2009187183 A | 8/2009 |
| JP | 2009230653 A | 10/2009 |
| JP | 2010205020 A | 9/2010 |
| JP | 2010225078 A | 10/2010 |
| JP | 2010244365 A | 10/2010 |
| JP | 2011022953 A | 2/2011 |
| JP | 2011107918 A | 6/2011 |
| JP | 2011145906 A | 7/2011 |
| WO | 33062969 A1 | 7/2003 |
| WO | 33075540 A2 | 9/2003 |
| WO | 2010005662 A1 | 1/2010 |
| WO | 2010073364 A1 | 7/2010 |
| WO | 2013019880 A1 | 2/2013 |

OTHER PUBLICATIONS

Chen, et al., "Secondary User Authentication based on Mobile Devices Location," 2010 Fifth IEEE International Conference on Networking, Architecture, and Storage, IEEE Computer Society, pp. 277-281.

International Search Report and Written Opinion—PCT/US2012/049190—ISA/EPO—Nov. 14, 2012.

Maeda T, "Realizing Instant Accurate Personal Authentication: Biometric Composite Authentication System," Monthly Bar Code, Japan, Japan Industrial Publishing Co., Aug. 2, 2001, vol. 14, No. 9, pp. 64-66.

Maeda T, "Instantly to the Exact Identity Authentication to Realize Biometrics Complex Authentication System, Monthly Bar Code," Japan, Japan Industrial Publishing Company, Aug. 2, 2001, vol. 14, No. 9, pp. 64-66.

Nikkei Computers : "PC Use that Will Change Broadband," Japan, Nikkei BP, Jan. 7, 2002, No. 400, p. 93.

Sawamura T., "A Proposal of an Authentication Method Using Multi-Touch", Computer Security Symposium 2010, Information Processing System, vol. 2010, Oct. 12, 2010, pp. 645-650.

\* cited by examiner

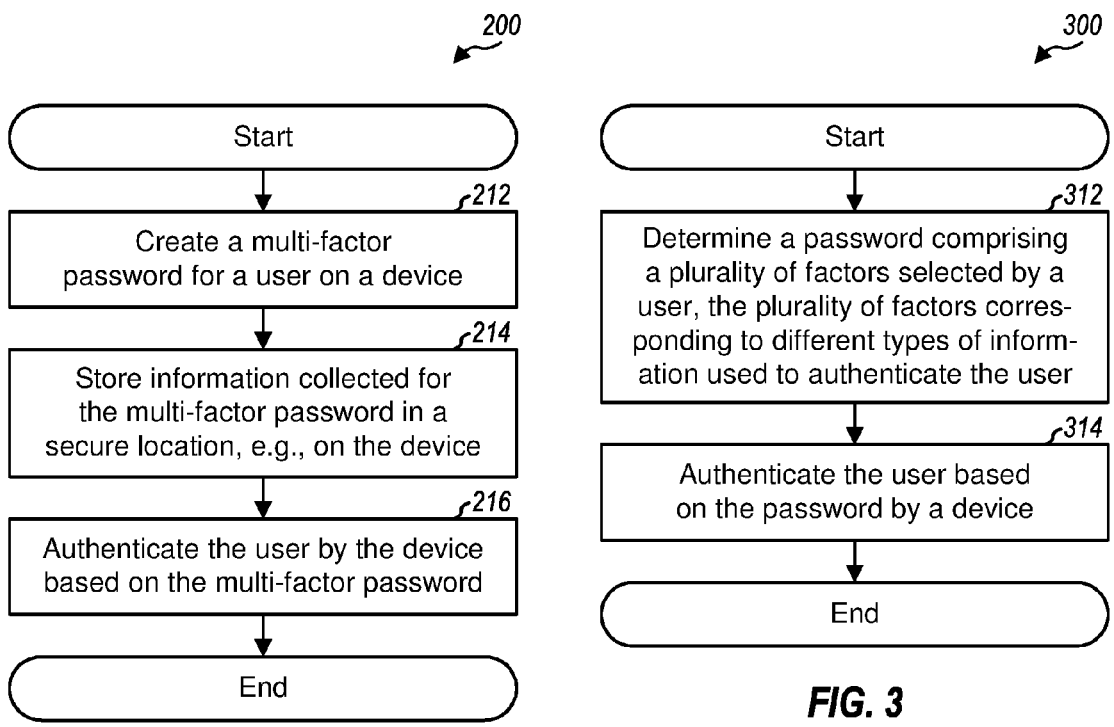

METHOD AND APPARATUS FOR USING A MULTI-FACTOR PASSWORD OR A DYNAMIC PASSWORD FOR ENHANCED SECURITY ON A DEVICE

CROSS-REFERENCE TO RELATED APPLICATION

This application is a continuation of U.S. patent application Ser. No. 13/196,864 filed Aug. 2, 2011 entitled, "METHOD AND APPARATUS FOR USING A MULTI-FACTOR PASSWORD OR A DYNAMIC PASSWORD FOR ENHANCED SECURITY ON A DEVICE", which is incorporated by reference.

BACKGROUND

Field

The present disclosure relates generally to communication, and more specifically to techniques for providing security on an electronics device.

Background

Electronics devices such as cellular phones, smart phones, tablets, etc., are widely used for various purposes and applications. These devices often store sensitive information (e.g., personal information) of users. These devices may also be utilized by the users to access sensitive information, which may be stored on servers or other devices. Since sensitive information may be stored on and/or accessible via the devices, security protection afforded by these devices should be of high standard and robust against unauthorized access.

A common scheme for providing security on a device is through the use of a password or a personal identification number (PIN). However, authentication based on the password or PIN may not be strong enough. This is because good passwords are often difficult to remember and are thus less likely to be used by most users. The users may use simple passwords that are easier to remember, which would compromise security on devices.

SUMMARY

In one aspect, a method of performing authentication may comprise: determining a first value of a dynamic password applicable for a first scenario, the dynamic password having a plurality of values for a plurality of scenarios defined by at least one parameter; authenticating a user in the first scenario by a device based on the first value of the dynamic password; determining a second value of the dynamic password applicable for a second scenario; and authenticating the user in the second scenario by the device based on the second value of the dynamic password. The method may further comprise: recording the plurality of values of the dynamic password for the plurality of scenarios during a training phase; and storing the plurality of values of the dynamic password for the plurality of scenarios. At least one parameter may comprise a parameter for time, wherein the first scenario corresponds to a first range of time, and wherein the second scenario corresponds to a second range of time. At least one parameter may comprise a parameter for location, wherein the first scenario corresponds to a first location for the device, and wherein the second scenario corresponds to a second location for the device. The plurality of scenarios may be defined by the user. The method may further comprise determining that the device is operating in one of the plurality of scenarios based on at least one sensor on the device. The dynamic password may comprise a plurality of factors, with at least one of the plurality of factors being selected by the user.

In one aspect, an apparatus for performing authentication, may comprise: at least one processor configured to: determine a first value of a dynamic password applicable for a first scenario, the dynamic password having a plurality of values for a plurality of scenarios defined by at least one parameter; authenticate a user in the first scenario based on the first value of the dynamic password; determine a second value of the dynamic password applicable for a second scenario; and authenticate the user in the second scenario based on the second value of the dynamic password. The at least one parameter may comprise a parameter for time, wherein the first scenario corresponds to a first range of time, and wherein the second scenario corresponds to a second range of time. The at least one parameter may comprise a parameter for location, wherein the first scenario corresponds to a first location for the apparatus, and wherein the second scenario corresponds to a second location for the apparatus. The dynamic password may comprise a plurality of factors, with at least one of the plurality of factors being selected by the user.

In one aspect, an apparatus for performing authentication, may comprise: means for determining a first value of a dynamic password applicable for a first scenario, the dynamic password having a plurality of values for a plurality of scenarios defined by at least one parameter; means for authenticating a user in the first scenario based on the first value of the dynamic password; means for determining a second value of the dynamic password applicable for a second scenario; and means for authenticating the user in the second scenario based on the second value of the dynamic password. The at least one parameter may comprise a parameter for time, wherein the first scenario corresponds to a first range of time, and wherein the second scenario corresponds to a second range of time. The at least one parameter may comprise a parameter for location, wherein the first scenario corresponds to a first location for the apparatus, and wherein the second scenario corresponds to a second location for the apparatus. The dynamic password may comprise a plurality of factors, with at least one of the plurality of factors being selected by the user.

In one aspect, a computer program product, may comprise: a computer-readable medium comprising: code for causing at least one processor to determine a first value of a dynamic password applicable for a first scenario, the dynamic password having a plurality of values for a plurality of scenarios defined by at least one parameter; code for causing the at least one processor to authenticate a user in the first scenario based on the first value of the dynamic password; code for causing the at least one processor to determine a second value of the dynamic password applicable for a second scenario; and code for causing the at least one processor to authenticate the user in the second scenario based on the second value of the dynamic password. The at least one parameter may comprise a parameter for time, wherein the first scenario corresponds to a first range of time, and wherein the second scenario corresponds to a second range of time. The at least one parameter may comprise a parameter for location, wherein the first scenario corresponds to a first location for the user, and wherein the second scenario corresponds to a second location for the user. The dynamic password may comprise a plurality of factors, with at least one of the plurality of factors being selected by the user.

BRIEF DESCRIPTION OF THE DRAWINGS

FIG. 2 shows a process for creating and using a multi-factor password.

FIGS. 3 and 4 show two processes for performing authentication based on a multi-factor password.

FIG. 5 shows a process for performing authentication based on a dynamic password.

DETAILED DESCRIPTION

Techniques for using multi-factor passwords and dynamic passwords to improve security on electronics devices (or simply, devices) are described herein. These techniques may be used for various types of devices such as cellular phones, smart phones, tablets, personal digital assistants (PDAs), laptop computers, netbooks, smartbooks, etc. These techniques may be used for devices that support wireless and/or wireline communication (e.g., cellular phones, smart phones, laptop computers, etc.) as well as devices that do not support communication.

A device may be used for various purposes and services such as communication, etc. The device may store sensitive information and/or may be used to access sensitive information for an owner/user of the device. The sensitive information may include personal information, business information, and/or other pertinent information. The user may protect the sensitive information with an alpha-numeric password, which may be defined by the user or assigned to the user. The user may be authenticated (e.g., when the user touches the device to select a service). The user may be granted access to the sensitive information if the user can enter the correct password when prompted. The password may be composed of a simple alpha-numeric string for ease of remembering and may be changed very infrequently or not at all. Hence, the password may not be very secure. The device should have enhanced security protection to ensure only authorized access to the sensitive information stored on the device and/or accessible via the device.

In an aspect, a device can provide enhanced security protection via use of a multi-factor password. A multi-factor password is a password composed of multiple factors. A factor is a part of a password and comprises a certain type of information used for authentication and/or other purposes. The multiple factors may correspond to different types of information that make up the password. The use of multiple factors for the password increases the strength of the password and enhances security. The multi-factor password may be defined by the user and not by a system.

Figure 1:
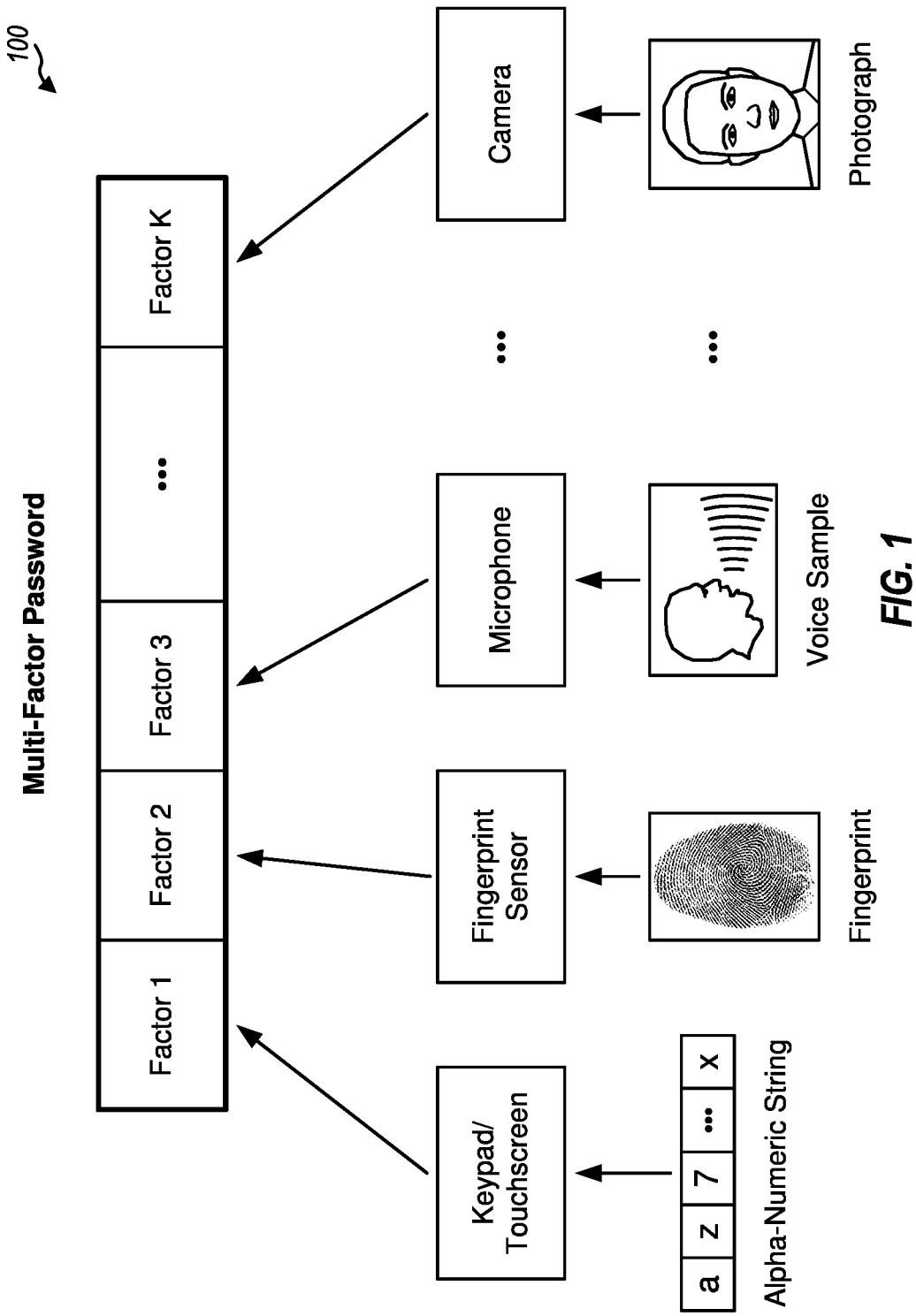
FIG. 1 shows a design of a multi-factor password.

FIG. 1 shows an exemplary design of a multi-factor password 100 that may be used for a device. In this design, multi-factor password 100 includes K factors 1 through K, where K may be any integer value greater than one. Each factor may correspond to any type of information that may be provided by a user to the device via a suitable input mechanism. In the example shown in FIG. 1, factor 1 may be an alpha-numeric string (e.g., an ASCII string) that may be entered by the user via a keyboard, or a touchscreen, or a keypad on the device, factor 2 may be a fingerprint that may be entered by the user via a fingerprint sensor on the device, factor 3 may be a voice sample that may be entered by the user via a microphone on the device, and so on, and factor K may be a photograph that may be entered by the user via a camera on the device. The K factors may also include other types of information beside the four exemplary types of information shown in FIG. 1.

In general, multiple factors of a multi-factor password may be defined based on any input mechanisms (e.g., input/output (I/O) means and sensors) on a device. Various sensors (e.g., cameras) are now commonplace on devices, and more sensors are expected to be available in the future. Biometric sensors are being introduced on devices such as phones, tablets, etc. For example, fingerprint sensors are available on many phones in some countries (e.g., United States and Japan). The biometric sensors may be external sensors that connect to devices or may be embedded on the devices themselves. For example, the technology to embed sensors (e.g., fingerprint sensors) on glass is commercially available.

In one design, one or more of the following factors may be used for a multi-factor password:

Alpha-numeric string—can be provided via a keyboard, a touchscreen, or a keypad, Voice—can be provided via a microphone, Picture or video'can be provided via a camera, Fingerprint'can be provided via a fingerprint sensor, Device orientation—can be provided via a gyroscope, Cursor action—can be provided via a mouse, a touchscreen, or a touchpad, Motion (e.g., speed and/or movement)—can be provided by a motion sensor, Heartbeat—can be provided by a biometric sensor, Location—can be provided by any positioning method, and Other types of information.

An alpha-numeric string may be used as a factor of a multi-factor password. An alpha-numeric string may comprise any sequence of characters and/or numerals in any language. A character may be an alphabet (e.g., "a"), a numeral (e.g., "3"), a special character (e.g., "#"), etc. An alpha-numeric string may also comprise any character or symbol entered by a user, e.g., via a touchscreen, a touchpad, a mouse, or some other input device. An alpha-numeric string composed of alphabets, numerals, and/or special characters may be considered as a single factor. For example, an alpha-numeric string "txsp921&$" is composed of a single factor of "txsp921&$". This alpha-numeric string is not composed of multiple factors, e.g., "txsp", "921" and "&S". An alpha-numeric string may be selected by a user or may be assigned to the user. An alpha-numeric string may be used as a factor in a multi-factor password or may be omitted from a multi-factor password. In the latter case, a multi-factor password may include different types of information other than alpha-numeric information.

A fingerprint may be used as a factor of a multi-factor password and may be entered via a suitable sensor, which may be external to a device or built-in to the device. A fingerprint factor may cover any number of fingers of a user and any sequence of fingers, with thumbs also being considered as fingers. For example, a fingerprint factor may be defined for the index/pointing finger of the user's natural hand, or the user's right thumb followed by the left thumb, or a combination of the index finger and middle finger, etc. The fingerprint factor would pass authentication if an entered fingerprint matches a recorded fingerprint.

Voice may be used as a factor of a multi-factor password in various manners. In one design, a voice factor may be defined for a specified phrase (e.g., "the fox crosses the street"). In this design, the voice factor would pass authentication if the user says the specified phrase. In another design, a voice factor may be defined based on characteristics of the user's voice. For example, a recording of the user saying a specific phrase (e.g., the user's name "John Doe") may be analyzed for certain characteristics (e.g., spectral content, pitch, etc.) and recorded or stored on the device. Thereafter, the user may say the same phrase during an authentication process. The entered voice sample from the user may then be analyzed and compared against the recorded voice sample. The voice factor would pass authentication if the characteristics of the entered voice sample match those of the recorded voice sample. A voice factor may thus be defined for what is said, or how something is said, or both.

Picture and/or video may be used as a factor of a multi-factor password in various manners. In one design, a picture of a particular person (e.g., the user) or a particular object (e.g., a hand) may be used for a picture factor. In another design, a video clip (e.g., of the user panning the camera across his/her face) may be used for a video factor. For both designs, a factor for a picture or a video may be defined for a particular type of content and/or the accuracy of the content. For example, a factor for a picture may be defined for a specific body part (e.g., face or hand), and this factor may be authenticated if this body part is captured and entered during the authentication process. As another example, a factor for a picture may be defined for the user's face, and this factor may be authenticated if a captured image of the user's face matches a recorded image of the user's face.

Device orientation may be used as a factor of a multi-factor password. The orientation of a device (e.g., horizontal or vertical) may be determined based on a gyroscope on the device. A factor for device orientation may be defined to comprise a specific orientation of the device (e.g., horizontal or vertical) or a specific sequence of orientations of the device (e.g., horizontal followed by vertical). The device orientation factor would pass authentication if the entered orientation or sequence of orientations matches the specified orientation or sequence of orientations.

Cursor action(s) may be used as a factor of a multi-factor password and may be provided via a mouse, a touchscreen, a touchpad, etc. A cursor factor may be defined to comprise a specific cursor action or a specific sequence of cursor actions on a device. For example, a cursor factor may be defined with the user clicking (or tapping) on a specific location on a screen (e.g., the lower left corner) or a set of locations on the screen (e.g., the upper right corner followed by the lower left corner). As another example, a cursor factor may be defined with the user dragging the mouse (or sliding a finger) in a particular pattern on the screen (e.g., a circular pattern, or a diagonal line from one corner to the opposite corner, or an "X" pattern). As yet another example, a cursor factor may be defined with the user simultaneously sliding the thumb and index finger in a closing or pinching motion. In any case, a cursor factor would pass authentication if the entered cursor action(s) match the specified cursor action(s).

Motion (e.g., speed or movement) of a device may be used as a factor of a multi-factor password and may be detected by a motion sensor on a device. A motion factor may be defined to comprise a specific motion (e.g., a horizontal motion, a vertical motion, a circular motion, etc.) of the device. During the authentication process, the user may move the device in a particular motion, which may be captured by the motion sensor on the device. The motion factor would pass authentication if the captured motion matches the specified motion.

Heartbeat and/or other biometrics of a user may be used as a factor of a multi-factor password and may be detected by suitable biometric sensors on a device. A biometric factor may be defined to include one or more biometrics of the user and may be recorded and stored on the device. The biometric factor would pass authentication if the captured biometric(s) of the user at the time of authentication matches the recorded biometric(s) of the user.

Location of a device or a user may be used as a factor of a multi-factor password. Location may be determined based on any suitable positioning method and may not have to be accurate. For example, a cell identity (ID) of a serving cell may be used as an approximate location of the device. Location may also be determined based on a global navigation satellite system (GNSS), etc. A location factor may pass authentication if the location of the device or user at the time of authentication matches a recorded location.

Various factors that may be used for a multi-factor password have been described above. Other factors may also be defined for other types of information and used for a multi-factor password. In general, any information that can be captured or provided to a device may be used as a factor of a multi-factor password. Each factor may correspond to different type of information provided by an output of a sensor.

In general, a multi-factor password may include any number of factors and any particular factor. In one design, a multi-factor password may include one instance of each factor selected for use. For example, a multi-factor password may be defined to include <alpha-numeric string>, <fingerprint>, <photo of face>, and <voice sample>. In another design, a multi-factor password may include multiple instances of a particular factor. For example, a multi-factor password may be defined to include <alpha-numeric string>, <fingerprint>, <photo of face>, <photo of hand>, and <voice sample>, with a picture factor appearing twice. In general, multiple instances of a given factor in a multi-factor password may include the same content (e.g., the same alpha-numeric string) or different contents (e.g., different alpha-numeric strings).

In one design, a multi-factor password is order sensitive, and the order of the multiple factors of the multi-factor password is important. In this design, a user would have to enter information for the multiple factors in the correct order to be authenticated. In another design, a multi-factor password is not order sensitive. In this design, a user may enter information for the multiple factors of the multi-factor password in any order. In yet another design, one or more factors of a multi-factor password may be order sensitive, and the remaining factors of the multi-factor password may not be sensitive. For example, the first factor of a multi-factor password may be required to be an alpha-numeric string, and the remaining factors may be for any type of information and may be provided in any order. In one design, a user may select a multi-factor password to be order sensitive or not order sensitive. In another design, a device or some other entity may require a multi-factor password to be order sensitive or may not impose any requirements on the order of the multiple factors.

In one design, various attributes of a multi-factor password may be defined by a user. For example, the number of factors, the order of the factors, and/or which specific factors to use for a multi-factor password may be selected and defined by the user based on the user's preference and/or requirements. Allowing the user to define various attributes of the multi-factor password may provide certain advantages. First, allowing the user to define the multi-factor password may enable the user to more easily remember the multi-factor password, which may encourage the user to define a more complicated multi-factor password. Second, allowing the user to define the multi-factor password would likely result in multi-factor passwords from different users having different formats or structures (e.g., different numbers of factors and/or different orders of the factors), which would increase security of the multi-factor passwords.

In another design, certain attributes of a multi-factor password may be specified by a device or some other entity and followed by a user. For example, there may be a requirement for a multi-factor password to include at least one instance of a factor for an alpha-numeric string, or for a certain minimum length of an alpha-numeric string, etc.

FIG. 2 shows a design of a process 200 for creating and using a multi-factor password. A user may create a multi-factor password on a device (block 212). To create the multi-factor password, the user may enter a mode in which the device expects the user to enter the multi-factor password. The device may assist the user in defining the multi-factor password. For example, the user may be provided with a list of factors supported by the device and may select multiple factors (e.g., one factor at a time) from this list for the multi-factor password. The user may provide information for each selected factor via an appropriate input mechanism on the device.

For example, the user may define the multi-factor password to include four factors composed of <4-character password>, <thumb fingerprint>, and <photograph>. The user may then type in four characters (e.g., "!$%^") for the first factor, then use a fingerprint sensor associated with the device to record the user's thumb print for the second factor, and then use a camera to record a photograph for the third factor. The user may then indicate to the device that the entry of multiple factors for the multi-factor password is complete. This may be achieved by using a pre-defined mechanism (e.g., a designated button) on the device.

The user may also enter more than one factor in parallel. For example, the user may enter a right thumb print while typing some characters with the left hand. In general, the multiple factors may be entered in any order, and with any number of factors being entered at a time.

Block 212 may be referred to as a training phase in which the device learns the multi-factor password of the user. The training phase may occur at any time and may be initiated by the user, or the device, or some other entity (e.g., an application), etc. The training phase may also occur whenever the user decides to change the multi-factor password and/or some other entity determines that the multi-factor password should be changed.

The device may store information recorded or collected for the multi-factor password in a secure location (block 214). In general, the recorded information for the multi-factor password may be stored on the device and/or in a server/database that may be accessible to the device via a wired and/or wireless connection. In one design, the recorded information for all factors may be stored on the device. In another design, recorded information for some factors may be stored on the device, and recorded information for remaining factors may be stored on a server or some other entity. In yet another design, the recorded information for all factors may be stored on a server or another device. In one design, the information for each factor may be converted to a format suitable for that type of information. In this design, different types of information for different factors may be processed separately in suitable formats. This may facilitate storage of the information for each factor and/or authentication of each factor at a later time. The information for the multi-factor password may be stored in an encrypted format or an unencrypted format.

The user may be authenticated at a later time by the device based on the multi-factor password (block 216). Authentication of the user may be initiated by various trigger events such as the user wishing to be authenticated, or the device or some other entity wishing to authenticate the user, etc. For the authentication process, the user may enter the multiple factors of the multi-factor password using suitable input mechanisms, which may be the same as or similar to the input mechanisms used in the training process to define the multi-factor password. The device may verify whether the information entered by the user for all factors of the multi-factor password matches the recorded information for these factors. This verification may be achieved in various manners.

In one design, the multi-factor password may be order sensitive. In this case, the device may compare the entered information for one factor at a time (e.g., in the order entered by the user) against the recorded information for that factor. In particular, the device may compare the entered information for the first factor entered by the user against the recorded information for the first factor of the multi-factor password, then compare the entered information for the second factor entered by the user against the recorded information for the second factor of the multi-factor password, etc. The user may be authenticated if both the order of factors as well as their content are verified.

In another design, the multi-factor password may not be order sensitive. In this case, the device may compare the entered information for one factor at a time (e.g., in the order entered by the user) against the recorded information for each factor of the multi-factor password. In particular, the device may compare the entered information for the first factor entered by the user against the recorded information for each factor of the multi-factor password, then compare the entered information for the second factor entered by the user against the recorded information for each factor of the multi-factor password, etc. The user may be authenticated if the entered information matches the recorded information for the multiple factors of the multi-factor password. In one design, the user may be limited to entry of K factors. Thus, the number of factors entered by the user for authentication may be limited by the number of factors of the multi-factor password.

The device may match the entered information against the recorded information for the multi-factor password in various manners. In one design, the entered information for each factor may be converted to a suitable format, e.g., the same format used to store the recorded information for that factor. If the recorded information is encrypted prior to storage, then the device may decrypt the stored information before comparing the entered information against the recorded information. The device may repeat the comparison process for each of the multiple factors of the multi-factor password. If the entered information matches the recorded information for all factors of the multi-factor password, then the user may be authenticated and allowed to access the device.

A user may be authenticated based on a multi-factor password, as described above. For authentication, the user may enter information for all factors of the multi-factor password (e.g., via input mechanisms and/or sensors). The entered information for all factors may be considered as being for a single password and may be compared against the recorded information for all factors of the multi-factor password. Hence, even though the multi-factor password is composed of multiple parts, the user will be authenticated based on the entire multi-factor password and not on any one factor or part.

Multi-factor password authentication (i.e., authentication of a new user with a multi-factor password) may be different from multi-factor authentication. For multi-factor authentication, a system may ask a user for different types of information, and the user may enter each type of information requested by the system. For example, the system may first ask the user for a username, then for a password, then for the maiden name of the user's mother, then for the date of birth of the user, then for the last four digits of the user's social security number, etc. Multi-factor authentication is typically defined by the system with no inputs from the user. Hence, the system may select which types of information to request from the user. Furthermore, the system may select the order in which each type of information is requested. The system may also ask the user for different types of information via separate queries. Hence, the system may use the same set of queries to ask for the same set of information from all users. In contrast, for multi-factor password authentication, a user may have an input on some or all aspects of the multi-factor password. For example, the user may select which factors to use for the multi-factor password and the order in which the factors appear in the multi-factor password. Different sets of factors may be used for multi-factor passwords of different users.

Multi-factor password authentication may be user specific (or specified by a user) whereas multi-factor authentication may be system specific (or specified by a system). Furthermore, multi-factor password authentication may be considered as a parallel process with all factors being for one password whereas multi-factor authentication may be considered as a sequential process with each factor being treated separately.

FIG. 3 shows a design of a process 300 for performing authentication based on a multi-factor password. Process 300 may be performed by a device (as described below) or by some other entity. The device may determine a password comprising a plurality of factors selected by a user (block 312). The plurality of factors may correspond to different types of information used to authenticate the user. The device may authenticate the user based on the password (block 314).

In one design, the plurality of factors may comprise an alpha-numeric string, a fingerprint of the user, a voice clip, a picture, a video, cursor action, a biometric of the user, orientation of the device, motion of the device, some other factor or information, or a combination thereof. In one design, the password may comprise only one instance of each of the plurality of factors. In another design, the password may comprise multiple instances of at least one factor (e.g., multiple instances of a factor for an alpha-numeric string).

In one design, the password may be order sensitive, and the order of the plurality of factors may be considered in authenticating the user. The order of the plurality of factors may be selected by the user or may be fixed. In another design, the password may not be order sensitive, and the plurality of factors may be entered in any order for authentication of the user.

Figures 4, 5:
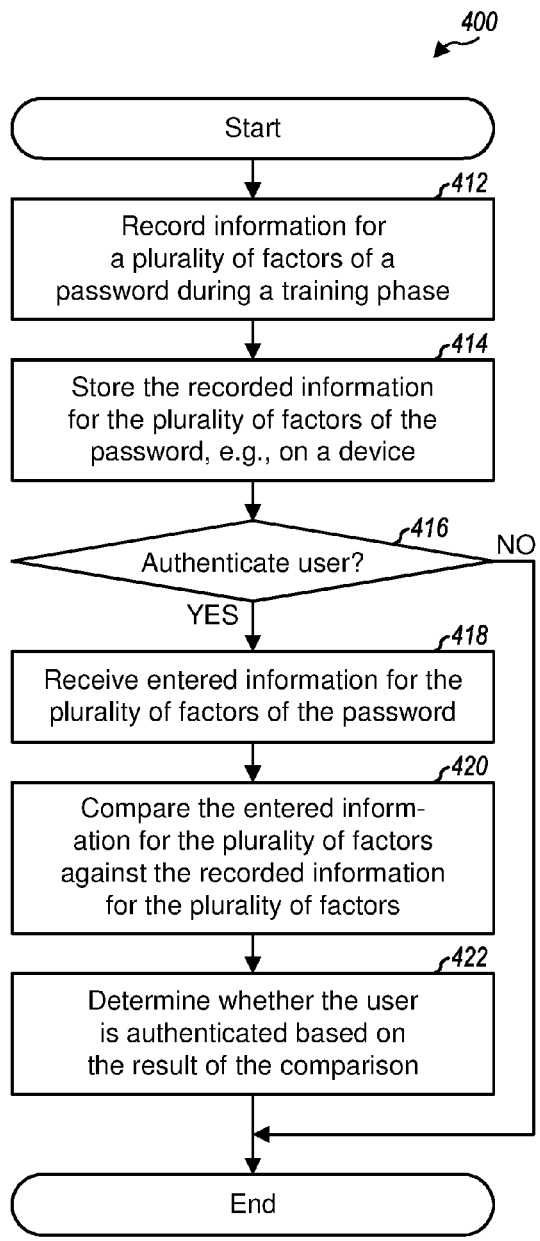

FIG. 4 shows a design of a process 400 for performing authentication based on a multi-factor password. Process 400 may be performed by a device (as described below) or by some other entity. The device may record information for a plurality of factors of a password for a user during a training phase (block 412). The device may store the recorded information for the plurality of factors of the password (e.g., in different formats) on the device and/or a server/database (block 414). In one design, the device may encrypt the recorded information for the plurality of factors and may store the encrypted recorded information. The device may also store the recorded information for the plurality of factors without encryption.

A determination may be made whether to authenticate the user (block 416). If the answer is 'Yes', then the device may receive entered information for the plurality of factors of the password (block 418). The entered information for a given factor may be manually provided by the user via a suitable input mechanism such as a keyboard, a keypad, a touchscreen, a microphone, a camera, a mouse, etc. The entered information for a given factor may also be provided by a sensor on the device such as a fingerprint sensor, a gyroscope, a biometric sensor, etc.

The device may compare the entered information for the plurality of factors against the recorded information for the plurality of factors (block 420). The device may determine whether the user is authenticated based on the result of the comparison (block 422). In one design, the factors of the password may be order sensitive. In this design, the device may compare the entered information for the k-th factor entered for the password against the recorded information for the k-th factor of the password, with k running from 1 to K, and K being the number of factors of the password. The device may declare that the user is authenticated if the entered information for the k-th factor entered for the password matches the recorded information for the k-factor of the password, with k running from 1 to K. In another design, the factors of the password may not be order sensitive. In any case, the device may determine whether the user is authenticated based on the result of the comparison in block 420 (block 422).

In another aspect, a dynamic password that varies with at least one parameter may be used to increase security. The dynamic password may be defined by a user and not a system. The dynamic password may comprise one or more factors and may change based on the at least one parameter. The dynamic password may be considered as (i) comprising a single password having different values for different scenarios or equivalently (ii) comprising a number of passwords, with each password being applicable for a particular scenario. For clarity, the description below assumes the definition given in (i).

In one design, a dynamic password may change based on a parameter for time. For example, a user may define a dynamic password to include a fingerprint of an index finger in the morning and a fingerprint of a ring finger in the afternoon. In this example, the dynamic password would change with time of day. As another example, the dynamic password may vary for different days of the week and may include one value for weekdays and another value for weekends. A dynamic password may also be defined to change with time in other manners.

In another design, a dynamic password may change based on a parameter for location. For example, a user may define a dynamic password to include a first alpha-numeric string at home and a second alpha-numeric string at work or away from home. In this example, the dynamic password would change with the location of a device. The current location of the device may be determined based on various positioning methods such as GNSS, cell ID, etc.

In yet another design, a dynamic password may change based on the desired security clearance. For example, a user may define a dynamic password to include (i) a first multi-factor password with fewer factors for access to a device with authorization to engage in less secure transactions and (ii) a second multi-factor password with more factors for access to the device with authorization to engage in more secure transactions. The user may then access the device with the appropriate multi-factor password depending on the desired security clearance.

In yet another design, a dynamic password may change based on available battery power on a device. For example, a user may define a dynamic password to include fewer factors for low battery power, and more factors for high battery power.

A dynamic password may also change based on other parameters besides the ones described above. In one design, a dynamic password may change based on environmental and/or sensory inputs. In another design, a dynamic password may change based on a device-specific parameter. For example, a dynamic password may have a first value if a user is accessing an account from a trusted device or a second value if the user is accessing the account from a shared device, as defined by the user. A dynamic password may also change based on a combination of parameters (e.g., location and time). For example, a dynamic password may have a first value in the morning at the office, a second value in the evening at home, etc. In general, a dynamic password may be defined based on any parameter that can be (i) determined by a sensor or some other mechanism on a device or (ii) ascertained in other manners. A dynamic password may be dependent on any function of one or more sensor outputs.

For a dynamic password, a plurality of scenarios may be defined for at least one parameter, and one value of the dynamic password may be associated with each scenario. For example, a parameter for time of day may include a first scenario from 6AM to 10PM and a second scenario from 10PM to 6AM. A first value of the dynamic password may be associated with the first scenario, and a second value of the dynamic password may be associated with the second scenario. As another example, a parameter for location may include a first scenario for home location, a second scenario for work location, and a third scenario for the remaining location. A first value of the dynamic password may be associated with the home location, a second value of the dynamic password may be associated with the work location, and a third value of the dynamic password may be associated with the remaining location. In general, a plurality of scenarios for at least one parameter may be defined with any number of levels of granularity (e.g., any number of time ranges for a time of day parameter).

In one design, various attributes of a dynamic password may be defined by a user. For example, which parameter(s) to use for a dynamic password, the definition of each parameter, and/or the value of the dynamic password for each scenario may be defined by the user based on the user's preference and/or requirements. Allowing the user to define various attributes of the dynamic password may provide advantages such as those described above for a multi-factor password. In another design, which parameter(s) to use for a dynamic password, the definition of each parameter, and/or the password for each parameter value may be specified by a device or some other entity for a user.

FIG. 5 shows a design of a process 500 for performing authentication based on a dynamic password. Process 500 may be performed by a device (as described below) or by some other entity. The device may record values of a dynamic password for a user during a training phase (block 512). The dynamic password may have a plurality of values for a plurality of scenarios defined by at least one parameter, e.g., one value for each scenario. The plurality of scenarios may be defined by the user or specified in other manners. The device may store the plurality of values of the password for the plurality of scenarios on the device and/or a server/database (block 514).

The device may determine a first value of the dynamic password applicable for a first scenario (block 516). The device may authenticate the user in the first scenario based on the first value of the dynamic password (block 518). Thereafter, the device may determine a second value of the dynamic password applicable for a second scenario (block 520). The device may authenticate the user in the second scenario based on the second value of the dynamic password (block 522). The device may determine that it is operating in one of the plurality of scenarios based on information available to the device, information from at least one sensor on the device, etc.

In one design, the at least one parameter may comprise a parameter for time. The first scenario may correspond to a first range of time, and the second scenario may correspond to a second range of time. Each range of time may correspond to a range of hours in a day, a range of days in a week, etc. In another design, the at least one parameter may comprise a parameter for location. The first scenario may correspond to a first location (e.g., home location) for the device, and the second scenario may correspond to a second location (e.g., work location) for the device. The at least one parameter may also comprise other parameters.

In one design, the dynamic password may comprise a single factor, which may be for an alpha-numeric string, a fingerprint, etc. One value for this single factor may be stored on the device for each scenario. In another design, the dynamic password may comprise a plurality of factors, and at least one of the plurality of factors may be selected by the user. One value comprising a plurality of portions, one portion for each factor, may be stored for each scenario.

Figure 6:
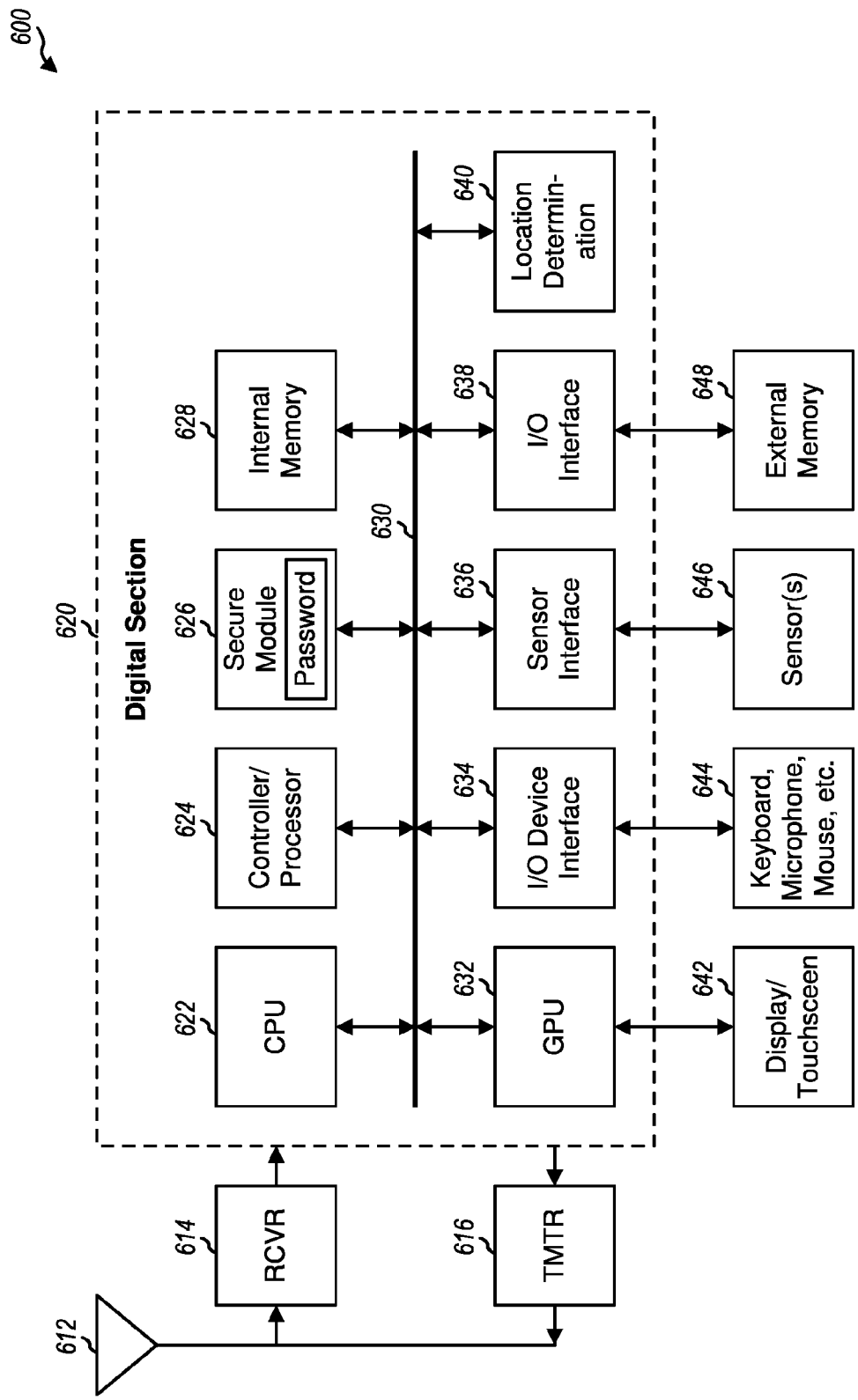
FIG. 6 shows a block diagram of a device.

FIG. 6 shows a block diagram of a design of a device 600, which may be capable of performing the techniques described herein. Device 600 may be a cellular phone, a smart phone, a tablet, a PDA, a laptop computer, a netbook, a smartbook, a terminal, a handset, etc. Device 600 may support communication via one or more wireless communication networks, which may include a Code Division Multiple Access (CDMA) network, a Global System for Mobile Communications (GSM) network, a Long Term Evolution (LTE) network, a wireless local area network (WLAN), etc.

Device 600 can support bi-directional communication via a receive path and a transmit path. In the receive path, signals transmitted by base stations and/or other devices may be received by an antenna 612 and provided to a receiver (RCVR) 614. Receiver 614 may condition and digitize a received signal and provide input samples to a digital section 620 for further processing. In the transmit path, a transmitter (TMTR) 616 may receive data to be transmitted from digital section 620. Transmitter 616 may process and condition the data and may generate a modulated signal, which may be transmitted via antenna 612 to the base stations and/or other devices.

Digital section 620 may include various processing, interface, and memory components such as, for example, a central processing unit (CPU) 622, a controller/processor 624, a secure module 626, an internal memory 628, a graphics processing unit (GPU) 632, an input/output (I/O) device interface module 634, a sensor interface module 636, a I/O interface module 638, and a location determination module 640, all of which may communicate via a bus 630.

CPU 622 may perform processing for data transmission and reception, e.g., encoding, modulation, demodulation, decoding, etc. CPU 622 may also perform processing for various applications such as, e.g., voice call, web browsing, multimedia, games, user interface, positioning, etc. GPU 632 may perform processing for text, graphics, and video and may provide its output to a display 642. GPU 632 may also receive inputs entered by a user via display 642 if it is a touchscreen. Controller/processor 624 may direct the operation of various processing and interface modules within digital section 620.

Secure module 626 may securely store sensitive information, passwords (e.g., a multi-factor password and/or a dynamic password), and/or other information for device 600. Memory 628 may store information and/or other data for device 600. Module 634 may interface with I/O devices such as a keyboard, a keypad, a mouse, a touchpad, etc. Module 634 may receive inputs from the I/O devices and may provide these inputs to controller 624. Module 636 may interface with sensors such as a fingerprint sensor, a gyroscope, a biometric sensor, etc. Module 636 may receive inputs from the sensors and may provide these inputs to controller 624. Module 638 may facilitate transfer of data between digital section 620 and an external memory 648. Module 640 may determine the location of device 600 based on measurements of satellites, base stations, and/or other transmitter stations.

Controller/processor 624 and/or other modules in device 600 may perform or direct process 200 in FIG. 2, process 300 in FIG. 3, process 400 in FIG. 4, process 500 in FIG. 5, and/or other processes for the techniques described herein. Controller 624 may determine recorded information for a multi-factor password or a dynamic password based on inputs from GPU 632, module 634, and/or module 636 during a training phase. Controller 624 may store the recorded information (e.g., with or without encryption) in secure module 626, a server, and/or some other device. Controller 624 may obtain entered information for the multi-factor password or the dynamic password based on the inputs from GPU 632, module 634, and/or module 636 during an authentication phase. Controller 624 may authenticate a user based on the recorded information and the entered information for the multi-factor password or dynamic password.

Digital section 620 may be implemented with one or more digital signal processors (DSPs), micro-processors, reduced instruction set computers (RISCs), etc. Digital section 620 may also be implemented on one or more application specific integrated circuits (ASICs) or some other type of integrated circuits (ICs).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a DSP, an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of performing authentication, comprising:
   receiving, during a training phase, a dynamic password comprising a plurality of password values, each password value of the plurality of password values being associated with one of a plurality of scenarios defined by at least one parameter;
   determining a first scenario of the plurality of scenarios for the dynamic password, the first scenario determined based on a current state of the at least one parameter;
   obtaining a first password value from the plurality of password values that is associated with the first scenario;
   authenticating a user by a device using a user supplied value for the dynamic password based on the first password value;
   determining a second scenario of the plurality of scenarios for the dynamic password, the second scenario determined based on a new current state of the at least one parameter;
   obtaining a second password value from the plurality of password values that is associated with the second scenario; and
   authenticating the user by the device using a second user supplied value for the dynamic password based on the second password value.

2. The method of claim 1, further comprising:
   recording the plurality of values of the dynamic password for the plurality of scenarios during the training phase; and
   storing the plurality of values of the dynamic password for the plurality of scenarios.

3. The method of claim 1, wherein the at least one parameter comprises a parameter for time, wherein the first scenario corresponds to a first range of time, and wherein the second scenario corresponds to a second range of time.

4. The method of claim 1, wherein the at least one parameter comprises a parameter for location, wherein the first scenario corresponds to a first location for the device, and wherein the second scenario corresponds to a second location for the device.

5. The method of claim 1, wherein the plurality of scenarios are defined by the user.

6. The method of claim 1, further comprising:
   determining the current state of the at least one parameter based on at least one sensor on the device.

7. The method of claim 1, wherein the dynamic password comprises a plurality of factors, with at least one of the plurality of factors being selected by the user.

8. An apparatus for performing authentication, comprising:
   means for receiving, during a training phase, a dynamic password comprising a plurality of password values, each password value of the plurality of password values being associated with one of a plurality of scenarios defined by at least one parameter;
   means for determining a first scenario of the plurality of scenarios for the dynamic password, the first scenario determined based on a current state of the at least one parameter;
   means for obtaining a first password value from the plurality of password values that is associated with the first scenario;
   means for authenticating a user using a user supplied value for the dynamic password based on the first password value;
   means for determining a second scenario of the plurality of scenarios for the dynamic password, the second scenario determined based on a new current state of the at least one parameter;
   means for obtaining a second password value from the plurality of password values that is associated with the second scenario; and
   means for authenticating the user using a second user supplied value for the dynamic password based on the second password value.

9. The apparatus of claim 8, wherein the at least one parameter comprises a parameter for time, wherein the first scenario corresponds to a first range of time, and wherein the second scenario corresponds to a second range of time.

10. The apparatus of claim 8, wherein the at least one parameter comprises a parameter for location, wherein the first scenario corresponds to a first location for the apparatus, and wherein the second scenario corresponds to a second location for the apparatus.

11. The apparatus of claim 8, wherein the dynamic password comprises a plurality of factors, with at least one of the plurality of factors being selected by the user.

12. An apparatus for performing authentication, comprising:
   at least one processor configured to:
   define, during a training phase, a dynamic password comprising a plurality of password values, each password value of the plurality of password values being associated with one of a plurality of scenarios defined by at least one parameter;
   determine a first scenario of the plurality of scenarios for the dynamic password, the first scenario determined based on a current state of the at least one parameter;
   obtain a first password value from the plurality of password values that is associated with the first scenario;
   authenticate a user using a user supplied value for the dynamic password based on the first password value;
   determine a second scenario of the plurality of scenarios for the dynamic password, the second scenario determined based on a new current state of the at least one parameter;
   obtain a second password value from the plurality of password values that is associated with the second scenario; and
   authenticate the user using a second user supplied value for the dynamic password based on the second password value.

13. The apparatus of claim 12, wherein the at least one parameter comprises a parameter for time, wherein the first scenario corresponds to a first range of time, and wherein the second scenario corresponds to a second range of time.

14. The apparatus of claim 12, wherein the at least one parameter comprises a parameter for location, wherein the first scenario corresponds to a first location for the apparatus, and wherein the second scenario corresponds to a second location for the apparatus.

15. The apparatus of claim 12, wherein the dynamic password comprises a plurality of factors, with at least one of the plurality of factors being selected by the user.

16. A computer program product, comprising:
a computer-readable medium comprising:
code for causing at least one processor to define, during a training phase, a dynamic password comprising a plurality of password values, each password value of the plurality of password values being associated with one of a plurality of scenarios defined by at least one parameter,
code for causing at least one processor to determine a first scenario of the plurality of scenarios for the dynamic password, the first scenario determined based on a current state of the at least one parameter,
code for causing at least one processor to obtain a first password value from the plurality of password values that is associated with the first scenario,
code for causing the at least one processor to authenticate a user using a user supplied value for the dynamic password based on the first password value,
code for causing at least one processor to determine a second scenario of the plurality of scenarios for the dynamic password, the second scenario determined based on a new current state of the at least one parameter,
code for causing the at least one processor to obtain a second password value from the plurality of password values that is associated with the second scenario, and
code for causing the at least one processor to authenticate the user using a second user supplied value for the dynamic password based on the second password value.

17. The computer program product of claim 16, wherein the at least one parameter comprises a parameter for time, wherein the first scenario corresponds to a first range of time, and wherein the second scenario corresponds to a second range of time.

18. The computer program product of claim 16, wherein the at least one parameter comprises a parameter for location, wherein the first scenario corresponds to a first location for the user, and wherein the second scenario corresponds to a second location for the user.

19. The computer program product of claim 16, wherein the dynamic password comprises a plurality of factors, with at least one of the plurality of factors being selected by the user.

* * * * *